L. COLLIS.
AMUSEMENT APPARATUS.
APPLICATION FILED OCT. 19, 1908.
929,753.
Patented Aug. 3, 1909.
4 SHEETS—SHEET 3.
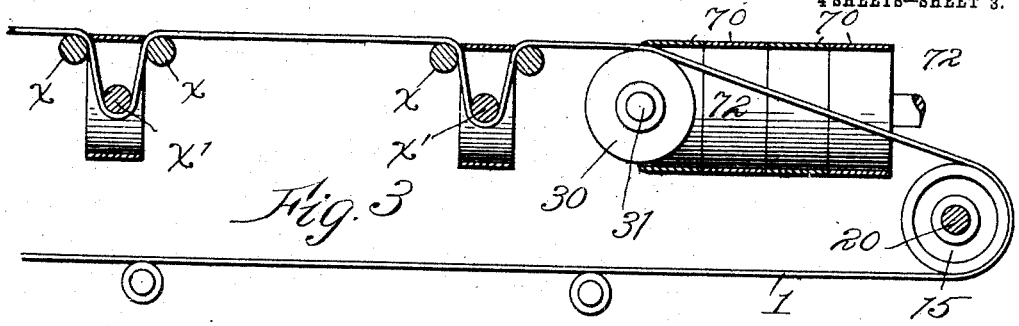
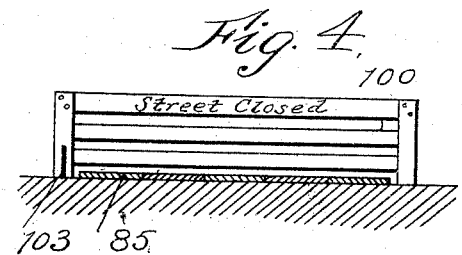
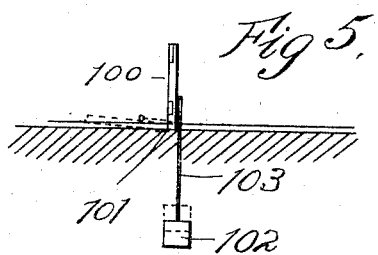
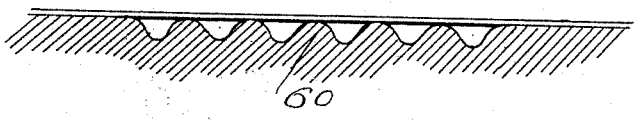
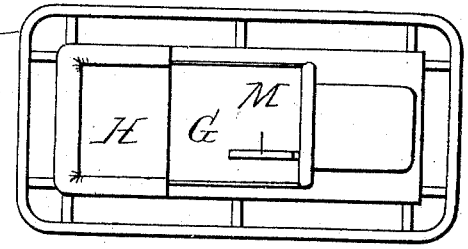
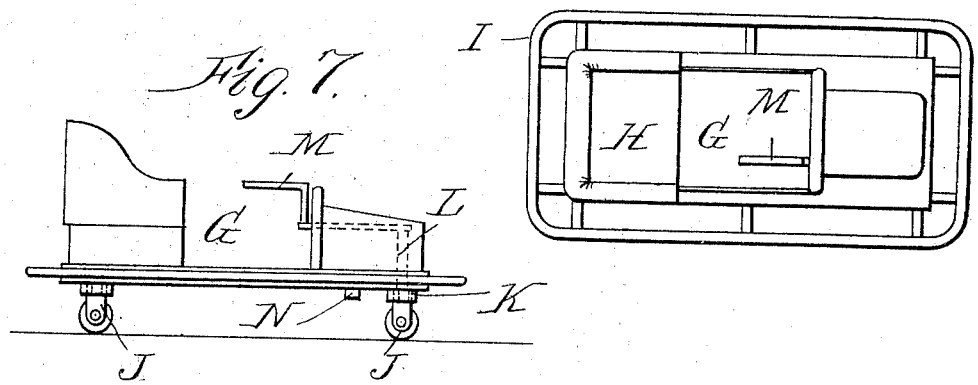
Witnesses:
Wm. A. Courtland
F. M. Ryan
Lloyd Collis
Inventor,
By his Attorneys
Knight Bros.

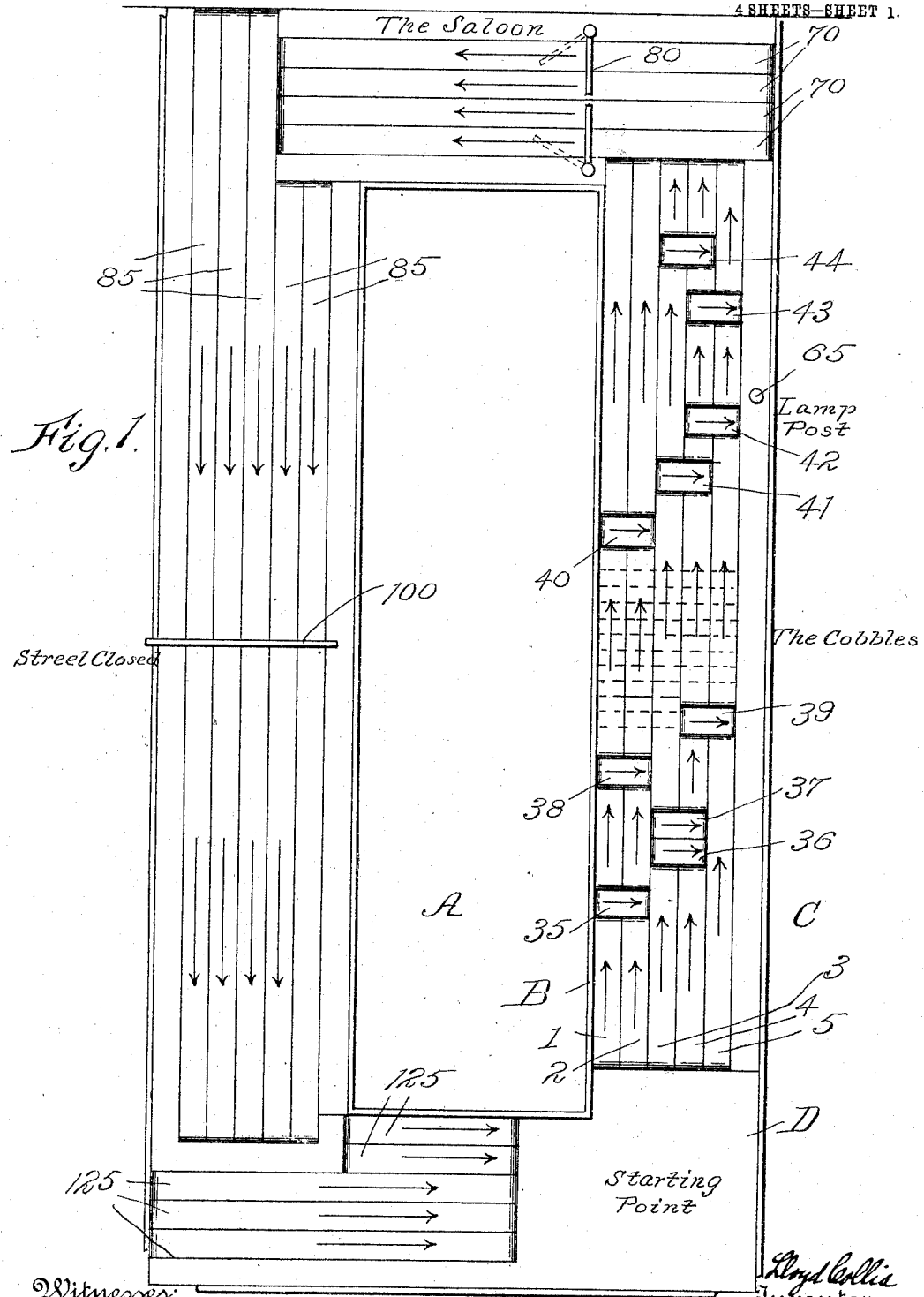

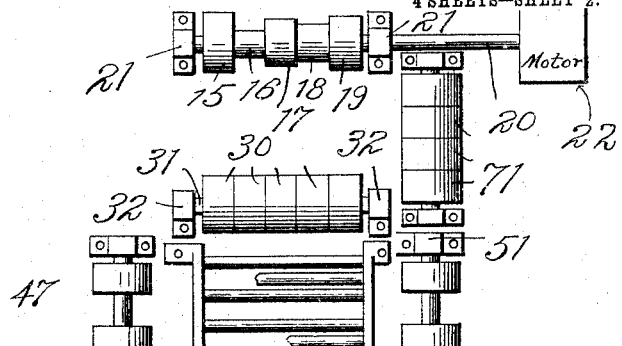

L. COLLIS.
AMUSEMENT APPARATUS.
APPLICATION FILED OCT. 19, 1908.
929,753.
Patented Aug. 3, 1909.
4 SHEETS—SHEET 4.
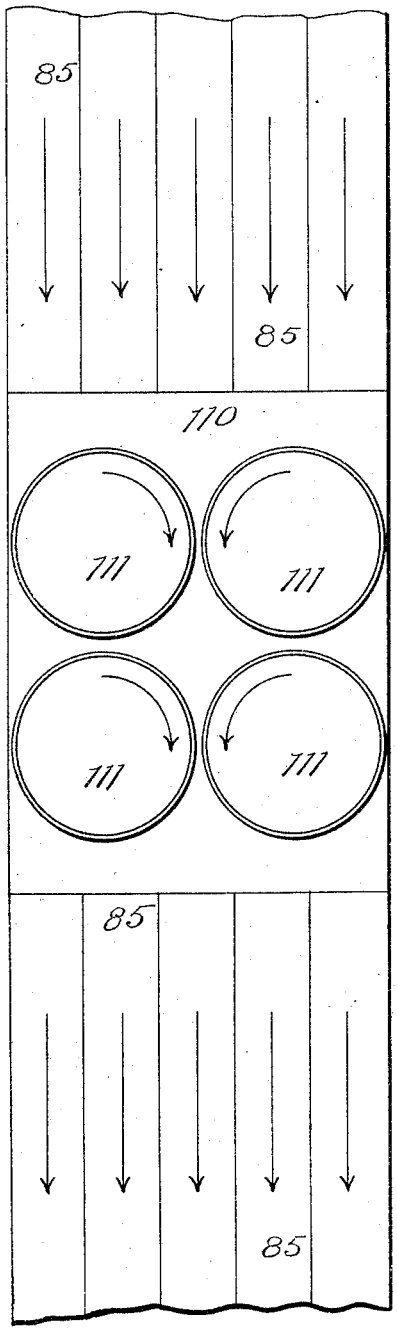
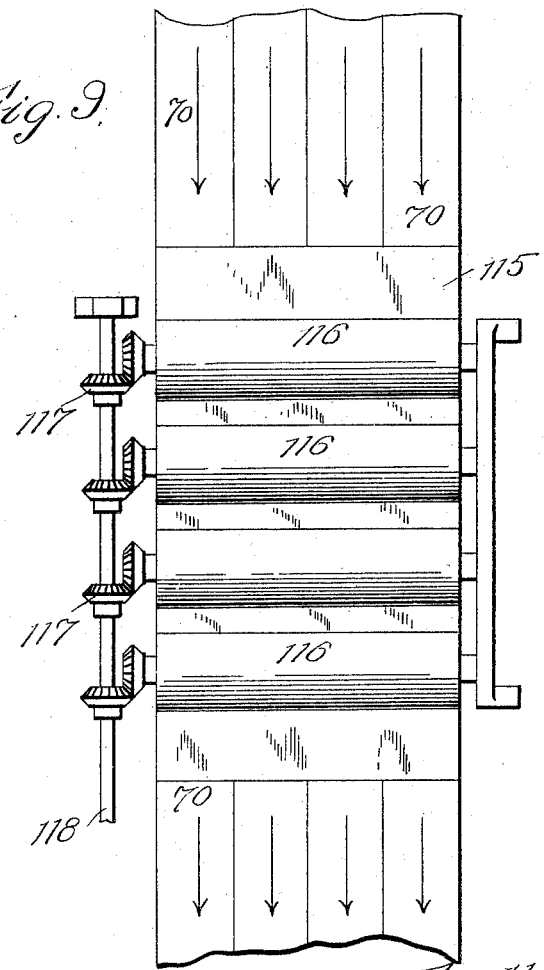
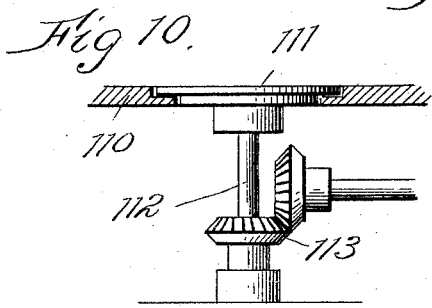
Witnesses:
Wm. A. Courtland
F. M. Ryan
Lloyd Collis
Inventor,
By his Attorneys

UNITED STATES PATENT OFFICE.

LLOYD COLLIS, OF NEW YORK, N. Y.

AMUSEMENT APPARATUS.

No. 929,753.  Specification of Letters Patent.  Patented Aug. 3, 1909.

Application filed October 19, 1908.  Serial No. 458,534.

*To all whom it may concern:*

Be it known that I, LLOYD COLLIS, a citizen of the United States, residing at New York, county of New York, State of New York, have invented certain new and useful Improvements in Amusement Apparatus, of which the following is a specification.

My invention relates to the type of amusement apparatus in which a vehicle is carried upon a traveling surface for the purpose of amusing the occupants of the vehicle.

My invention comprises a traveling surface or surfaces, arranged within a suitable inclosure, and driven by suitable operating means, in combination with a receptacle or vehicle for carrying passengers.

In the preferred form of my invention I provide a plurality of conveying surfaces traveling in the same general direction at different rates of speed, so that the vehicle resting upon these surfaces will be given a general forward movement and will have imparted to it uncertain lateral and rotating movements. In combination with the main traveling surfaces, or belts, I may employ short transverse belts which are interposed at intervals between sections of the main belts for further increasing the irregularities of the movements of the car or vehicle.
I also provide obstructions of various kinds in the path of the vehicle, some of which obstructions may be rigid, while others may be yieldingly mounted so as to give way under the strain of the contact of the vehicle therewith.

While the main conveying surfaces of my apparatus are preferably in the form of belts driven by rollers, I may also include rotating circular plates or disks in the track and horizontally arranged rollers over which the car or vehicle is carried.

In order that my invention may be fully understood, I will first describe the same with reference to the accompanying drawings and afterward point out the novelty more particularly in the annexed claims:—

Figure 1 is a diagrammatic plan view of one form of my invention. Fig. 2 is a plan view of the supporting and driving mechanism for the series of conveyer belts shown in Fig. 1. Fig. 3 is an enlarged detail longitudinal sectional view of part of the mechanism shown in Figs. 1 and 2. Figs. 4 and 5 are sectional elevations of one form of yielding obstruction arranged across the series of conveyer belts. Fig. 6 is a detail longitudinal sectional view of a part of the track illustrating an undulating surface beneath the conveyer belts. Figs. 7 and 8 are respectively a side elevation and a plan view of the passenger car or receptacle. Figs 9, 10, and 11 are detailed views of modifications of parts of my apparatus.

In the preferred plan of my amusement apparatus I arrange a plural series of conveying surfaces upon four sides of a central oblong space, said surfaces being so related that the general tendency will be to carry a car or receptacle around the central inclosure and deliver it at the starting point. This central inclosure, which I have indicated as A in Fig. 1, is surrounded by a low fence or railing B, around which extends the track or course over which the receptacles or vehicles are carried. The track is inclosed from the outside by a similar fence or railing C.

Over the floor of one section of the track leading from the starting point (indicated at D) I arrange a number of long conveyer belts 1, 2, 3, 4, and 5. These belts may be of any suitable material, but are preferably formed of heavy canvas. At the starting point D the belts 1, 2, 3, 4, and 5 are supported by idler pulleys 6, 7, 8, 9, and 10, which are mounted upon a transversing shaft 11, journaled in any suitable bearings such, for instance, as the brackets 12 shown in Fig. 2 of the drawings. The belts 1, 2, 3, 4, and 5 are supported at their far ends upon a series of driving belt pulleys 15, 16, 17, 18, and 19, which are of different diameters for imparting different speeds to several belts. The driving belt pulleys are keyed upon a driving shaft 20, suitably journaled in bearings 21 and driven by any suitable power such, for instance, as by an electric motor, indicated diagrammatically at 22. Beneath the upper carrying laps of the belts 1, 2, 3, 4, and 5, and between the ends of these belts, are arranged a number of small transverse rollers $x$ and $x'$, around which the upper laps of said belts are passed (as shown in Fig. 3 of the drawings) for the purpose which will presently be explained. Adjacent to the rear end of the belts 1, 2, 3, 4, and 5, with their upper peripheries in the same horizontal plane as rollers $x$, are the guiding pulleys or idlers 30 upon the transverse shaft 31, journaled in bearings 32. The purpose of the idlers 30 is to firmly support the belts 1, 2, 3, 4, and 5 adjacent to the edge of the first of the second series of belts presently to be referred to, said belts 1, 2, 3, 4, and 5 passing downwardly from pulleys 30 to the driving pulleys 15, 16, 17, 18, and 19 (shown in Fig. 3 of the drawing). The carrying surfaces of the belts 1, 2, 3, 4, and 5, which are interrupted by passing around the transverse rollers $x$ and $x'$, as above explained, are intersected at intervals by short transverse belts 35, 36, 37, 38, 39, 40, 41, 42, 43, and 44, each of which is carried upon the driving pulleys 45, mounted upon long driving shaft 46, journaled in bearings 47, and driven by any suitable power (such as motor 48) and by the idler pulleys 49 mounted upon shaft 50, journaled in bearings 51. As shown, all of the short transverse belts 35, 36, 37, etc., travel in the same direction and at the same speed, although it will be perfectly clear to those skilled in the art that the speed of these transverse belts can be differentiated at will by simply changing the relative size of their driving pulleys. The floor or underneath support of the conveying portions of the main belts 1, 2, 3, etc., may be formed, as shown in 86 of the drawings, with a number of transverse ribs and recesses 60 to present a corrugated or ribbed effect, over which the belts travel. I have designated this section of the apparatus as the "cobbles." At one side of the track or course I have arranged a stationary obstruction (as shown at 65), against which the vehicles may be thrown by the action of the conveying belts. This obstruction I have designated as the "lamp post."

The main conveyer belts 1, 2, 3, 4, etc., lead on to a second series 70, which are supported upon the idler pulleys 71 and 72, and are driven by a series of driving pulleys 73, 74, 75, and 76, mounted upon a driving shaft 77, driven by a motor 78. The pulleys 73 to 76 are given diameters to cause the belts 70 to travel in the same direction but at different rates of speed. Extending across the upper surfaces of the belts 70 I have shown two horizontal swinging doors or gates 80, which may be of any suitable construction, designed to open freely under the pressure of the car or vehicle passing through the doors or gates by the action of the belts 70. This section of the apparatus is for the sake of amusement, designated as the "saloon." The conveying belts 70 lead to another series of belts 85, which pass over, and which are supported by, the idler pulleys 86, 87, 88, 89, and 90, and are driven by a series of differentiated driving pulleys 91, 92, 93, 94, 95 keyed to the driving shaft 96, which is driven by motor 97. One or more of the driving pulleys may be mounted eccentrically upon the driving shaft 96, the pulley 95 being shown as an eccentric pulley. This eccentric mounting of one or more of the pulleys is for the purpose of imparting an irregular forward motion to one or more of the belts.

Extending across the series of belts 85 is a vertical obstruction or barricade 100, which is mounted upon horizontal hinges 101 and is held normally in an upright position by any suitable means such, for instance, as the weight 102, connected to the barricade by rope or chain 103, so that when a car is thrown into contact with the barricade it will yield and move over into horizontal position (as indicated by dotted lines in Figs. 1 and 5) to permit the car or vehicle to pass over it. The conveying belts 85 lead to the final series of the main belts 125, which are supported upon the idler pulleys 126 and 127, and the driving pulleys 130, keyed to the driving shaft 46 above referred to. It will be observed that the driving pulleys 130 are all of equal diameters so that the speed of the delivery belts 125 will be uniform and will consequently deliver the vehicle to the starting point D in the same position in which it would move on to the belts 125 from belts 85.

In Figs. 7 and 8 I have shown a simple form of vehicle, which may be used in conjunction with my apparatus. It will be understood that any suitable form of vehicle for carrying passengers may be employed, it being only necessary to afford sufficient stability to prevent the upsetting of the vehicle as it is being carried through the course. In the vehicle shown in the drawings, the body G has a seat H and is surrounded by a stout buffer frame I. The vehicle is preferably mounted upon caster wheels J, and, if desired, the front wheels may be placed upon opposite ends of a cross-bar K, centrally journaled upon the body of the vehicle and connected through the vertical bolt L with a hand-lever M, which may be operated by the occupants of the vehicle. In this event some form of stop such as shown at N should be provided to prevent the bar K from being turned too far.

In Figs. 9 and 10 I have shown a slight modification of my invention in which the conveying belts (such as 85) have their upper carrying surfaces interrupted by a platform 110 in which are mounted a plurality of circular plates or disks 111. Each of these plates or disks 111 is mounted at the end of a vertical shaft 112, which may be geared as shown at 113, to be rotated at the desired surface speed. These plates or disks 111 may be run in the same direction as indicated by the arrows, or they may be run in opposite directions. I prefer to operate said plates or disks at different speeds to increase the uncertainty of movement of the cars passing over them.

In Fig. 11 I have represented a further modification or extension of the invention.

In this figure the conveying belts, such as 70, are interrupted by a platform 115, which is formed with a series of transverse slots in which operate the transverse rollers 116 geared (as shown at 117) to a suitable driving shaft 118. This form of the device (as shown in Fig. 11) may be employed in place of the section shown in Fig. 6, known as the "cobbles", although it may be an added feature of the apparatus.

The operation of my apparatus will be understood from the following explanation;—The vehicle, with one or more persons, is moved from the starting point D of the apparatus on the leading portions of some of the main conveying belts 1, 2, 3, 4, etc. These belts are traveling in the same direction but at different speeds, so that the action of the belts upon the vehicle would be to advance one side of the vehicle more rapidly than the other with the result that the vehicle will be gradually turned around as it advances with the belts. The rapidity with which the vehicle turns depends, of course, upon the relative difference in speed between the several belts which are at the moment supporting the vehicle. As the vehicle advances it will shortly run on to one of the short transverse belts, 35, 36, etc., with the result that it will be given a further turning movement, or possibly a reversed turn, depending upon the direction in which the vehicle is turning when it strikes a transverse belt. The vehicle will turn sometimes one way, and sometimes another, but there will be a general progress of the vehicle along the course. In some instances the vehicle will be thrown lightly against the stationary obstruction or "lamp post" 65, in which event the buffer surrounding the vehicle will prevent accident.

The vehicle passes from the delivery ends of the main conveyer belt 1, 2, 3, etc., on to the transverse or end conveying belts 70, which have a general direction across the end of the oblong inclosure A. The belts 7 have the same uncertain turning effect upon the vehicle and carry the vehicle through the swinging doors or gates 80 into the section called the "saloon", said doors or gates yielding readily to the pressure of the vehicle, no matter whether the vehicle is advancing sidewise or longitudinally.

The vehicle is delivered by the belts 70 on to the main conveying belts 85, which continue their uncertain rotating and advancing effect upon the vehicle, carrying it over the "street closed" barricade which moves down to permit the passage of the vehicle, and finally delivering the vehicle on to the belts 125 which return it to the starting point D. As the car passes over the section 60 (indicated as the "cobbles") it will be bumped up and down and gently shaken as it moves forwardly, and in the event of the employment of the transverse rollers 116, the vehicle will have a similar movement imparted to it.

It will be understood that in some cases I embody the structure shown in Fig. 9 of the drawings as a part of the apparatus, the effect of the rotating disks 111 upon the vehicle being to rotate it in various directions depending upon the point of contact of the vehicle and the speed with which it passes over said disks 111.

It will be understood that the contiguous edges of the conveyer surfaces and the edge plates or platform will be arranged so closely together that all danger of interference with the wheels of the vehicle will be avoided. The vehicle wheels are in the form of casters and are free to turn in any direction in addition to their freedom of revolution. The arrangement for steering is not intended to have any material effect upon the progress or direction of movement of the vehicle.

My invention in its broadest sense comprises a course, a vehicle adapted to move through said course, means for advancing said vehicle in said course, and means for causing the irregular turning of the vehicle as it advances. My invention also includes the several detail features used in connection with said broad idea.

What I claim is:—

1. In an amusement apparatus, the combination with a vehicle, of a defined course, conveying means operating in said course for advancing said vehicle in said course, and means for causing one side of said vehicle to advance more rapidly than the other to turn the vehicle as it advances.

2. In an amusement apparatus, the combination with a vehicle, of a defined course, conveying means operating in said course for advancing said vehicle, and means for causing said vehicle to turn irregularly as it advances in said course.

3. In an amusement apparatus, the combination with a vehicle, of a defined course, a moving conveyer surface operating in said course to advance said vehicle, and means for causing said vehicle to turn as it advances.

4. In an amusement apparatus, the combination of a series of conveying surfaces, and means for operating said surfaces at different speeds, with a vehicle adapted to be carried by said conveying surfaces.

5. In an amusement apparatus, the combination of a defined course, a series of conveying surfaces operating in said course, and means for operating said surfaces at different speeds, with a vehicle adapted to be carried by said conveying surfaces.

6. In an amusement apparatus, the combination of a course defined by walls, a plurality of conveying surfaces moving in the same direction in said course, and auxiliary moving surfaces intersecting said main conveying surfaces, with a vehicle adapted to be carried by said surfaces.

7. In an amusement apparatus, the combination of a plurality of main conveying surfaces moving in the same direction, and auxiliary conveying surfaces moving at an angle to said main conveying surfaces, with a vehicle adapted to be carried by said conveying surfaces.

8. In an amusement apparatus, the combination of a plurality of main conveying surfaces, means for operating said main conveying surfaces at different speeds, and auxiliary conveying surfaces moving in the same plane with and intersecting said main conveying surfaces, with a vehicle adapted to be carried by said conveying surfaces.

9. In an amusement apparatus, the combination of a plurality of main conveying surfaces moving in the same direction in parallel relation, and auxiliary conveying surfaces, with a vehicle adapted to be carried upon said conveying surfaces.

10. In an amusement apparatus, the combination of a plurality of conveying belts operating in parallel relation in the same plane, means for driving said conveying belts at different speeds, and a vehicle adapted to be carried upon said belts.

11. In an amusement apparatus, the combination of a plurality of main conveying belts moving in the same direction, and auxiliary conveying belts moving at an angle to said main conveying belts, with a vehicle adapted to be carried upon said conveying belts.

12. In an amusement apparatus, the combination of a plurality of main conveying belts operating in parallel relation in the same plane, means for driving said main conveying belts at different rates of speed, auxiliary conveying surfaces operating in the same plane and interrupting said main conveying belts, and a vehicle adapted to be carried upon said belts and surfaces.

13. In an amusement apparatus, the combination of a plurality of rotatable surfaces, with a vehicle adapted to be carried over said rotating surfaces.

14. In an amusement apparatus, the combination of a plurality of rotatable conveying surfaces, with a vehicle adapted to be carried over said surfaces, and means for turning said vehicle as it advances over said surfaces.

15. In an amusement apparatus, the combination with a vehicle, of a course, a plurality of rotatable conveying surfaces in said course, adapted to advance said vehicle through said course, and means for causing said vehicle to turn as it advances.

16. In an amusement apparatus, the combination with a vehicle, of a course, and a plurality of rotating flat plates or disks arranged in approximately the same plane in said course and adapted to act upon said vehicle as it passes over them.

17. In an amusement apparatus, the combination with a vehicle, of a defined course, and means for advancing said vehicle in said course and turning the vehicle as it advances, said means including a plurality of rotating flat plates or disks over which said vehicle passes.

18. In an amusement apparatus, the combination of a plurality of main conveying belts, a plurality of rotatable surfaces arranged adjacent to said belts, and a vehicle adapted to be carried upon said belts and rotatable surfaces.

19. In an amusement apparatus, the combination of a plurality of main conveying belts, a plurality of rotatable surfaces arranged in the same general plane with said belts, stationary surfaces between said belts and said rotatable surfaces, and a vehicle adapted to be carried upon said belts and rotatable surfaces.

20. In an amusement apparatus, the combination of a plurality of conveying belts arranged in parallel relation in the same plane, and a plurality of rotating flat plates or disks arranged in approximately the same plane with said belts, means for driving said belts and plates or disks, and a vehicle adapted to be carried upon said belts and rotating plates or disks.

21. In an amusement apparatus, the combination of a defined course, a plurality of conveying belts arranged in parallel relation in approximately the same plane in said course, and a plurality of rotating flat plates or disks arranged in approximately the same plane with said belts in said course, means for driving said belts at different rates of speed, and a vehicle adapted to be carried upon said belts and rotating plates or disks.

22. In an amusement apparatus, the combination of a plurality of conveying belts operating in parallel relation in approximately the same plane, and a plurality of rollers extending transversely across the plane of said belts and forming alternate elevations and depressions, with a vehicle adapted to travel over said belts and rollers.

23. In an amusement apparatus, the combination of a defined course, a plurality of conveying belts operating in parallel relation in said track or course, and a plurality of rollers extending transversely across said course and forming alternate elevations and depressions, with a vehicle adapted to travel over said belts and rollers.

24. In an amusement apparatus the combination with a vehicle, of a traveling flexible conveyer belt for carrying said vehicle, means for operating said belt, and an uneven surface or support over which said belt travels to cause said vehicle to be bumped or shaken as it passes over said uneven surface.

25. In an amusement apparatus, the combination with a vehicle, of a traveling flexible conveying belt for carrying said vehicle, means for operating said belt, and a transversely ribbed support over which said belt travels.

26. In an amusement apparatus, the combination with a vehicle, of a plurality of traveling flexible conveying belts for carrying said vehicle, and an uneven surface or support over which said belts travel.

27. In an amusement apparatus the combination with a vehicle, of a plurality of traveling flexible conveying belts for carrying said vehicle, means for driving said belts at different speeds, and an uneven surface or support over which said belts travel.

28. In an amusement apparatus, the combination of a conveying surface, and a vehicle operating upon said surface, with a yielding obstruction extending across the path of said conveying surface.

29. In an amusement apparatus, the combination of a defined course, a conveying surface operating in said course, and a vehicle carried by said surface, with a yielding obstruction extending across said course.

30. In an amusement apparatus, the combination of a plurality of conveying belts, means for driving said belts at different speeds, and a vehicle adapted to be operated upon by said belts, with a yielding obstruction extending across the path of said belts.

31. In an amusement apparatus, the combination of a conveying surface, and a vehicle operating upon said surface, with a pivotably mounted gate or door forming a yielding obstruction extending across the path of said conveying surface.

32. In an amusement apparatus, the combination of a conveying surface, and a vehicle operating upon said surface, with two horizontally swinging gates or doors forming yielding obstructions extending across the path of said conveying surface.

33. In an amusement apparatus, the combination of a conveying surface, and a vehicle operating upon said surface, with a yielding barricade extending vertically across said conveying surface and pivoted to swing over into horizontal position when struck by said vehicle.

34. In an amusement apparatus, the combination of a plurality of conveying belts, means for driving said belts at different speeds, and a vehicle adapted to be carried by said belts, with a yielding barricade extending vertically across the path of said belts and pivotally mounted to swing over into horizontal position when struck by said vehicle to allow said vehicle to pass over said barricade.

LLOYD COLLIS.

Witnesses:
LAURA E. MONK,
WM. E. KNIGHT.